Aug. 21, 1962 W. J. ZIPPER 3,050,663
SOLENOID CONSTRUCTION
Filed Dec. 24, 1959

INVENTOR.
WALTER J. ZIPPER
BY
ATTORNEYS.

United States Patent Office 3,050,663
Patented Aug. 21, 1962

3,050,663
SOLENOID CONSTRUCTION
Walter J. Zipper, % Nuid Engineering Corp.,
3003 Pico Blvd., Santa Monica, Calif.
Filed Dec. 24, 1959, Ser. No. 861,852
6 Claims. (Cl. 317—186)

The present invention relates to an improved solenoid construction which is particularly useful for energization by an alternating current of four hundred cycles per second, the present solenoid being useful in all prior applications to which solenoids have been placed such as in braking systems, clutching systems, relays and the like. While the solenoid construction is particularly useful with an alternating energizing current of four hundred cycles, the present construction may be used, for example, in high speed solenoids.

A feature of the present construction is that the plunger and pole piece is formed from magnetizable tape and that the return path for the magnetic flux comprises a generally cylindrical housing member also formed from magnetizable tape.

An additional important feature of the present invention is that end members cooperate with the ends of the cylindrical housing through a mitered joint construction such that the magnetic flux path has a very small reluctance contributing substantially to an improved and more efficient solenoid construction than has heretofore been suggested, particularly so when the alternating energizing current has a frequency of approximately four hundred cycles and magnetizable tape is used in the construction.

It is therefore an object of the present invention to provide an improved solenoid construction having the features indicated above.

Another object of the present invention is to provide an improved solenoid construction which is particularly useful with alternating energizing currents of, for example, four hundred cycles.

Another object of the present invention is to provide an improved solenoid construction using mitered joints for the more efficient transfer of flux between elements of the same.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
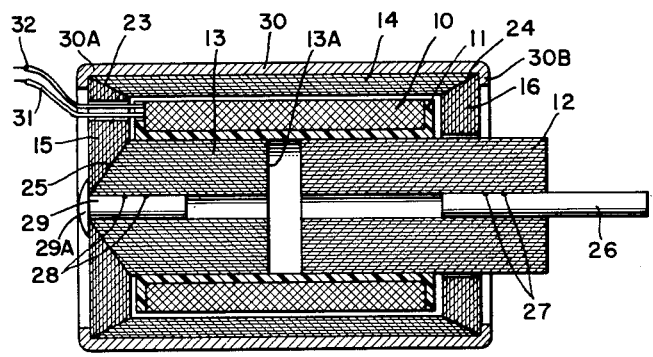
FIGURE 1 is a longitudinal cross sectional view through a solenoid construction embodying features of the present invention.
Figure 2:
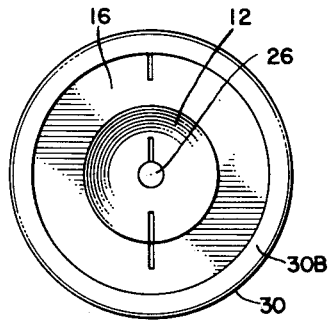
FIGURE 2 is an end view of the construction shown in FIGURE 1.

The solenoid construction shown in FIGURE 1 includes an energizing coil 10 wound in conventional manner on a coil form or spool 11 of non-metallic and insulating material. The construction includes also a movable plunger or armature 12 slidably mounted in the coil form 11 and cooperating with a stationary pole piece 13 which has its plunger-engaging end 13A located somewhat to the left of the center of the coil 10 in FIGURE 1 as illustrated therein. A cylindrical magnetizable housing member 14 encircles the coil 10 and together with the mitered ends or flanges 15 and 16 provide a portion of the return path for magnetic flux.

Figure 4:
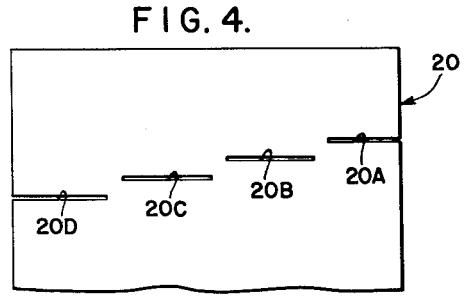
FIGURE 4 illustrates the arrangement of eddy current reducing slots in the magnetizable tape used in construction of the plunger, pole piece and a cylindrical housing illustrated in FIGURE 1.

In accordance with an important feature of the present invention, the plunger 12, pole piece 13 and cylindrical housing member 14 are each formed of magnetizable tape indicated generally at 20 in FIGURE 4, such tape having a plurality of series of slotted portions 20A, 20B, 20C and 20D therein to minimize the flow of eddy currents, it being contemplated that the coil 10 is energized with an alternating current of, for example, four-hundred cycles per second. As indicated previously, there is a plurality of such slots 20A–20D spaced along the length of the tape 20 so that in general when the tape 20 is wound in the form of a cylinder, there is generally one series of such slots 20A–20D per tape turn.

Figure 3:
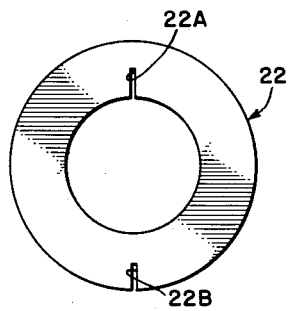
FIGURE 3 is a view in elevation of one of the mitered washer laminations incorporated in the construction shown in FIGURE 1.

The end members 15 and 16 are each formed of washer-shaped elements, indicated at 22 in FIGURE 3, each having a thickness of, for example, .005″ and of the same thickness of the tape 20 used in forming the housing member 14, pole piece 13 and plunger 12. The end members 15, 16 thus each comprise a stack of magnetizable washers in the form of laminations insulated from each other. Likewise, adjacent turns of the magnetizable tape comprising the members 13, 14 and 12 are insulated from each other. For this purpose the tape may be coated with a non-magnetic bonding agent prior to rolling in the form of a cylinder with such non-magnetic adhesive serving to magnetically insulate adjacent turns and, to some extent, to bond adjacent turns together. The same type of non-magnetic bonding agent may be used between adjacent washers comprising the end members 15 and 16.

In accordance with an important feature of the present invention, there are provided complementary mating and mitered surfaces between adjacent ends of the housing 14 and corresponding ones of the end members 15 and 16. The complemenary mating surfaces between the end 15 and one end of housing 14 being indicated at 23 and the similar mitered joint between the other end of housing 14 and the end member 16 being indicated at 24. Similarly, there is a mitered joint 25 at the junction of the stack of washers comprising end member 15 and the pole piece 13.

The various elements described previously are assembled as follows. The actuating rod 26, prior to rolling of the plunger 20, is spot-welded at 27 near an end of the tape and the tape is then wound in the form of a spiral cylinder to form the plunger 12. The outer end of the tape, i.e. the last turn of the tape, may be secured by spot-welding the same to the adjacent underlying turn.

The same assembly techniques are involved in forming the pole piece 13 with the inner portion of the tape being spot-welded at 28 to the body of a rivet 29 (having its head unpeened at this time) and the outer turn of the tape comprising pole piece 13 is likewise spot-welded to the adjacent underlying tape turn.

In forming the end members 15 and 16, a series of washers indicated at 22 in FIGURE 3 having eddy current reducing slots 22A and 22B therein are stacked and the stack of washers thus formed is tapered to provide one of the mating mitered surfaces forming the mitered joints 23 and 24 as previously indicated.

The cylindrical housing member 14 is rolled and the inner and outer ends may be spot-welded to the adjacent turns to secure the ends as previously indicated in connection with the fabrication of the cylindrically rolled members 12 and 13. The end member 13 is secured to the pole piece 13 by peening over the protruding end of the rivet 29 to form the rivet head 29A which serves to maintain firmly clamped the mating mitered surfaces 25 between the elements 13 and 15.

The coil form 11 with the coil 10 thereon is positioned in the housing 14 as shown in FIGURE 1, and the mating mitered surfaces comprising the joints 23 and 24 are firmly maintained together by the outer sleeve 30 which has its ends 30A and 30B turned inwardly to engage corresponding members 15 and 16. For that purpose this sleeve 30 should be of magnetic material.

The end member 15 is suitably apertured to allow passage of the energizing leads 31 and 32 for coil 10. As indicated previously, the material comprising flux-carrying parts is suitably slotted to minimize the flow of eddy currents. These slotted portions are positioned such that they serve their intended purpose without seriously impairing the strength of the tape or washers, as the case may be, so that no difficulties are encountered in the fabrication handling and assembly. For this purpose the washer 22 in FIGURE 3 is preferably slotted as shown with radially extending slotted portions 22A and 22B, the slotted portion 22A being open at the inner diameter of the washer 22 and the slotted portion 22B being open at the outer diameter of the washer 22. These slotted portions 22A and 22B in each of the washers 22 may be staggered with respect to similar slotted portions in adjacent washers in stacking of the same.

It will thus be seen in FIGURE 1 that the magnetic flux produced by the coil 10, in the attracted position of plunger 12, flows through a path which is typified as follows: namely, the lateral width of the tape comprising housing 14, the radial width of a washer comprising the end member 15, the width of a tape turn comprising the pole piece 13, the width of a tape turn comprising the plunger 12, a fixed air gap between the plunger 12 and the end member 16, and the radial width of a washer comprising the end member 16. Using this construction, it is noted that the maximum available length of each of the end members 15 and 16 is used in conveying flux, thereby contributing greatly to an improved efficient solenoid construction which is particularly useful when the energizing current is four hundred cycles per second. It is noted further that because of the closely fitting mitered joints 23 and 24, the individual washers comprising the end members 15 and 16 may be considered to be inwardly bent extensions of corresponding turns comprising the outer housing member 14. By the same token, the turns of tape comprising the pole piece 13 may be considered to be inwardly directed extensions of corresponding tape turns of the outer housing member 14.

Figure 5:
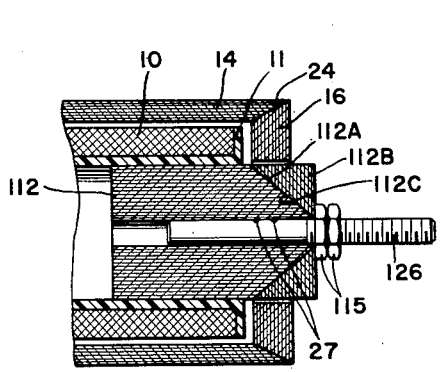
FIGURE 5 is a transverse cross sectional view through a portion of a modified solenoid construction also embodying features of the present invention.

The modification shown in FIGURE 5 is essentially of the same construction as described in connection with the above figures, the only change being in this case that the plunger 112 (corresponding to 12 above) is formed with a tapered surface 112A which is complementary with a mating tapered surface on the stack 112B of washer elements. In other words, there is a mitered joint or connection 112C between the rolled plunger 112 and the stack 112B of washers such that the stack 112B of washers may be considered to be upwardly directed extensions of corresponding turns of tape that comprise the plunger 112. During the range of movement of plunger 112, the stack 112B of washers has at least a portion thereof disposed within the end member 16. The washers comprising stack 112B are firmly maintained against corresponding turns of the tape comprising plunger 112 by nuts 115 threaded on the stem 126.

While for exemplary purposes a frequency of four hundred cycles per second has been specifically mentioned, it is, of course, understood that the arrangements disclosed herein are applicable to higher frequencies such as, for example, eight hundred cycles per second and higher and, indeed, may operate at much lower frequencies at, for example, sixty cycles per second, but the arrangement is particularly useful for operation at frequencies higher than commercial frequencies.

Figure 6:
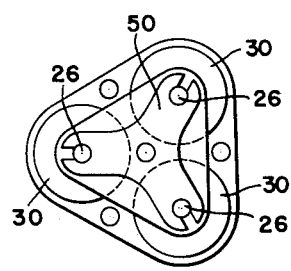
FIGURE 6 illustrates a modified form of the invention in which three separate units of the character shown above each have their plungers mechanically interconnected.

Referring to FIGURE 6, there is illustrated a plurality of units as described above, each having its movable plunger mechanically interconnected with each other. The coils of these three units are connected in parallel for simultaneous energization and joint movement of their plungers. The sleeves 30 of each unit are embedded in a suitable material such as, for example, aluminum, to maintain the same in parallel axial alignment. The plunger stems 26 are mechanically interconnected or coupled by the plate 50.

It has been observed, in the design of individual units, the pull is dependent on the particular size of the unit and it is not a simple matter to increase the pull by increasing the size of a unit but better results are accomplished, for greater pull, when small individual units are ganged together as illustrated in FIGURE 6.

While FIGURE 6 shows three such units, the number may be increased as desired and when there are three units, the coils of the same may be interconnected in a delta or star connection for energization by a three-phase source.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A solenoid construction comprising an energizing coil, a pole piece and a movable plunger projecting into said coil, an outer cylindrical housing member encircling said coil, said plunger, pole piece and said housing member being formed of magnetizable tape rolled generally in the form of a cylinder, a pair of end members, corresponding ends of said cylindrical housing member being tapered and contacting a corresponding mating tapered end of a corresponding end member, said pole piece also having one of its ends tapered, the other end of said one end member having a corresponding tapered surface contacting said tapered surface of said pole piece, the other end of the other end member being spaced from said plunger to provide an air gap between said other end member and said plunger, said plunger having a tapered surface, and a stack of laminations each in the form of washers mounted on said plunger, said stack having a tapered surface which meets and contacts the tapered surface on said plunger and said stack being spaced from said other end of said other end member.

2. A solenoid construction comprising an energizing coil, a pole piece and a movable plunger projecting into said coil, an outer cylindrical housing member encircling said coil, said plunger, pole piece and said housing member being formed of magnetizable tape rolled generally in the form of a cylinder, a pair of end members, corresponding ends of said cylindrical housing member being tapered and contacting a corresponding mating tapered end of a corresponding end member, said pole piece also having one of its ends tapered, the other end of said one end member having a corresponding tapered surface contacting said tapered surface of said pole piece, the other end of the other end member being spaced from said plunger to provide an air gap between said other end member and said plunger, each of said end members comprising a stack of washer-like laminations having a thickness substantially equal to the thickness of the tape forming said outer cylindrical member and said pole piece and corresponding ones of said washer-like elements contacting a corresponding turn of said tape forming said cylindrical housing member and said pole piece.

3. In a solenoid construction wherein tape is rolled to form a generally cylindrical movable plunger, a generally cylindrical pole piece and a generally cylindrical outer housing member with a coil positioned between said outer cylindrical housing member and said pole piece and said plunger, the improvement comprising providing a pair of end members each of which contacts a corresponding end of said cylindrical housing by a mitered joint, one of said end members also contacting said plunger by a mitered joint, each of said end members comprising a stack of washer-like laminations with the plane of the washer-like elements thereof extending generally perpendicular to the axes of said plunger, pole piece and cylindrical outer housing member.

4. In a solenoid construction of the character described wherein a movable plunger, a pole piece and an outer cylinder housing member are formed of magnetizable tape rolled generally in the form of a cylinder and wherein a coil is positioned between said outer cylindrical housing member and said plunger and said pole piece, the improvement comprising connecting one end of said outer housing member to one end of said plunger through an end member which has its opposite ends contacting respectively one end of said plunger and one end of said cylindrical housing member at mitered joints and connecting a second end member to the other end of said cylindrical housing member by a mitered joint, the other end of the last-mentioned end member being spaced from said plunger to provide an air gap therebetween, said plunger having mounted thereon a stack of laminations comprising washer-like elements having their planes extending generally perpendicular to the axis of movement of said plunger and said stack of washer-like elements being spaced from the second mentioned end member to provide an air gap therebetween.

5. In a solenoid construction, a movable plunger formed of magnetizable tape rolled generally in the form of a hollow cylinder, an actuating rod positioned in said hollow cylinder and being welded to the innermost turn of said hollow cylinder, a pole piece axially aligned with said plunger and formed of magnetizable tape rolled in the form of a hollow cylinder having its axis aligned with the axis of the plunger, a rivet extending into the hollow pole piece and welded to the innermost turn of the same, an end member secured to said pole piece by said rivet and comprising a stack of washer-like elements, complementary tapered surfaces on said end members and said plunger which provide a mitered connection between the same, the plane of said stack of laminations extending generally perpendicular to the axis of said plunger, an outer cylindrical housing member coaxially disposed about said pole piece and said plunger and formed of magnetizable tape rolled in the form of a cylinder, said end member and one end of said outer cylindrical member having cooperating contacting tapered surfaces which define a mitered connection between the same, a second end member formed of washer-like elements encircling said plunger with the plane of the last-mentioned washer-like elements extending generally perpendicular to the axis of said plunger, said second end member and the other end of said cylindrical housing member having cooperating tapered surfaces which provide a mitered connection between the same, a cylindrical retaining member encircling said cylindrical housing member and having its ends bent inwardly to firmly maintain the first-mentioned and said second end members firmly against corresponding ends of said cylindrical housing member, and an energizing coil surrounding a portion of said pole piece and said plunger.

6. A solenoid construction as set forth in claim 5 in which each of said end members, said plunger, said pole piece and said outer cylindrical housing member has slotted portions therein for minimizing the flow of eddy currents.

References Cited in the file of this patent

UNITED STATES PATENTS

| 2,294,322 | Van Der Woude | Aug. 25, 1942 |
| 2,467,489 | McClain | Apr. 19, 1949 |
| 2,539,547 | Mossman et al. | Jan. 30, 1951 |

FOREIGN PATENTS

| 7,856 | Great Britain | May 10, 1889 |